US008484722B2

(12) United States Patent
Sibley et al.

(10) Patent No.: US 8,484,722 B2
(45) Date of Patent: Jul. 9, 2013

(54) ENHANCED USER INTERFACE MANAGER AND METHOD FOR MANAGING NON-CONTEMPORANEOUS USER INTERFACE MODULES

(75) Inventors: Richard Paul Sibley, Kitchener (CA); Neil Adams, Waterloo (CA); Ravi Singh, Mississauga (CA)

(73) Assignee: Research In Motion Limited, Waterloo (CA)

( * ) Notice: Subject to any disclaimer, the term of this patent is extended or adjusted under 35 U.S.C. 154(b) by 1119 days.

(21) Appl. No.: 11/840,920

(22) Filed: Aug. 17, 2007

(65) Prior Publication Data
US 2008/0047004 A1 Feb. 21, 2008

Related U.S. Application Data

(63) Continuation-in-part of application No. 11/465,297, filed on Aug. 17, 2006.

(60) Provisional application No. 60/946,549, filed on Jun. 27, 2007.

(51) Int. Cl.
*G06F 21/00* (2006.01)

(52) U.S. Cl.
USPC ............................................ 726/20; 719/313

(58) Field of Classification Search
USPC ................. 726/20; 719/313; 718/108
See application file for complete search history.

(56) References Cited

U.S. PATENT DOCUMENTS

| 5,796,397 | A | | 8/1998 | Kusano |
| 6,102,284 | A | * | 8/2000 | Myers et al. ............. 235/375 |
| 6,430,556 | B1 | | 8/2002 | Goldberg et al. |
| 6,430,570 | B1 | | 8/2002 | Judge et al. |
| 6,874,145 | B1 | * | 3/2005 | Ye et al. ..................... 718/108 |
| 6,898,764 | B2 | | 5/2005 | Kemp |
| 6,948,152 | B2 | | 9/2005 | Dubovsky |
| 2003/0120712 | A1 | | 6/2003 | Reid |
| 2004/0075701 | A1 | | 4/2004 | Ng |
| 2004/0109017 | A1 | | 6/2004 | Rothman et al. |
| 2004/0205263 | A1 | * | 10/2004 | Sivaraman et al. ........... 710/21 |
| 2005/0223352 | A1 | | 10/2005 | Nishida |
| 2005/0229247 | A1 | | 10/2005 | Ishidera |
| 2005/0235139 | A1 | * | 10/2005 | Hoghaug et al. ............. 713/2 |
| 2006/0236364 | A1 | * | 10/2006 | Suni et al. ................... 726/1 |
| 2008/0046827 | A1 | | 2/2008 | Sibley et al. |

FOREIGN PATENT DOCUMENTS

| DE | 10065211 A1 | 5/2002 |
| EP | 0449438 A2 | 10/1991 |

OTHER PUBLICATIONS

International Search Report and Written Opinion issued on Dec. 14, 2007 in connection with International Application No. PCT/CA2007/001436.

Extended European Search Report, dated Jul. 13, 2009 relating to Application No. 07800464.5.

(Continued)

*Primary Examiner* — Ashok Patel
*Assistant Examiner* — Tracy Mangialaschi
(74) *Attorney, Agent, or Firm* — Ridout & Maybee LLP

(57) ABSTRACT

A user interface manager acts to cache state information and thread information provided to it by user interface modules, before the user interface modules cease execution. When a new user interface module commences execution, or the old user interface module recommences execution, the user interface module may request, from the user interface manager, the cached state information and thread information.

13 Claims, 8 Drawing Sheets

OTHER PUBLICATIONS

Deshdeep Singh, Atmosphere—the developer blog of Bernard Wong from the subliminal to the sublime . . . , introducing GINA (that's Graphical Identification and Authentication to you . . . ). MSND Blogs. Aug. 5, 2004. p. 1 to 3. http://blogs.msdn.con/bwong_ms/archive/2004/03/20/93350.aspx.

Partial European Search Report issued on Mar. 23, 2007 in connection with EP 06119122.7.1.

Abdul (Rajib) Bahar, Authentication against Active Directory and Edirectory via LDAP, Feb. 28, 2004 http://www.codeproject.com/dotnet/arbauthentication.asp?df=100&forum1d=32468&exp=)&fr=51&select=742142>.

International Business Machines Corporation, Diary as Screen Saver, Research Disclosure, Mason Publications, Hampshire, GB, vol. 451, No. 119, Nov. 2001.

\* cited by examiner

ENHANCED USER INTERFACE MANAGER AND METHOD FOR MANAGING NON-CONTEMPORANEOUS USER INTERFACE MODULES

CROSS REFERENCE TO RELATED APPLICATIONS

This patent application is a continuation-in-part of U.S. patent application Ser. No. 11/465,297, entitled "User Interface Manager And Method For Reacting To A Change In System Status" and filed on Aug. 17, 2006. Additionally, the present application claims priority to U.S. Provisional Patent Application Ser. No. 60/946,549, filed Jun. 27, 2007, the contents of which are hereby incorporated herein by reference.

FIELD OF THE INVENTION

The present application relates generally to user interfaces and, more specifically, to an enhanced user interface manager and method for managing non-contemporaneous user interface modules.

BACKGROUND OF THE INVENTION

It is common practice to configure a computer workstation so that the workstation can be used by several different users. To maintain personalized settings and privacy among the users in the context of the use of the workstation, an operating system for such a workstation typically provides a logon user interface. A user completes an authentication process through interaction with the logon user interface to gain access to the applications that are available to be executed on the workstation. It follows that the workstation may be considered to have a logged off system status and a logged on system status. Furthermore, responsive to direct user instruction, or due a period of inactivity, the workstation may become locked. That is, the workstation may present the logon user interface and require the user to complete the authentication process over again to return to accessing various applications executed by the workstation. The locked system status may be considered very similar to the logged off system status.

There are known to exist computer peripheral devices for which a workstation-to-peripheral connection may be established without regard for the system status of the workstation. Such connections have corresponding authentication protocols and, therefore, need not rely on the authentication protocols handled by the workstation operating system. Notably, establishment of a workstation-to-peripheral connection generally requires user input and the workstation may require multiple user interface modules with a selection of a particular user interface module being dependent upon system status.

BRIEF DESCRIPTION OF THE DRAWINGS

Reference will now be made to the drawings, which show, by way of example, embodiments of the invention, and in which.

DETAILED DESCRIPTION OF THE EMBODIMENTS

Figure 1:
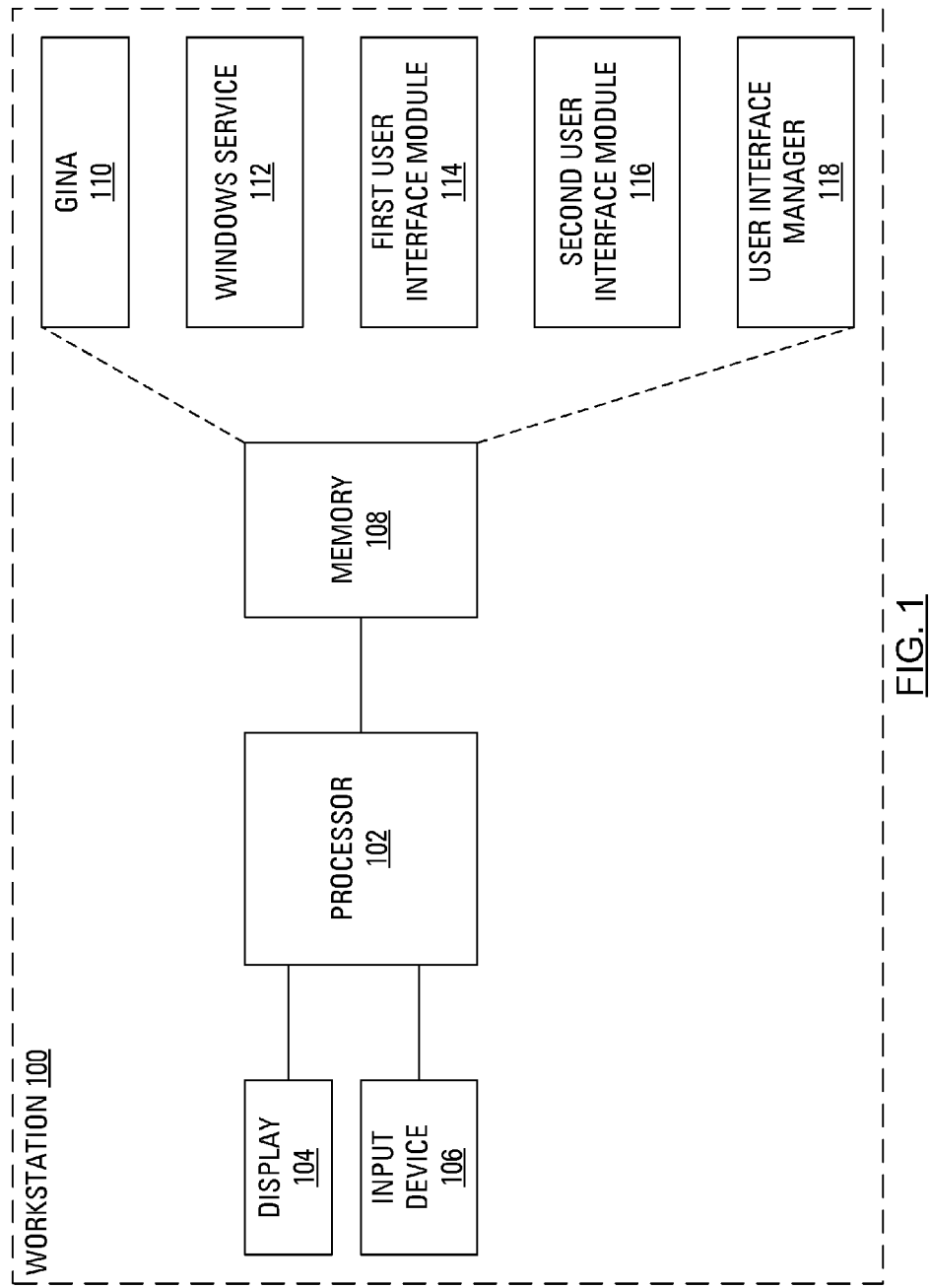
FIG. 1 illustrates a workstation adapted to embody aspects of the present application.

It has been discovered that a problem arises in a scenario wherein the workstation performs a transition from the logged on system status to the locked system status while establishment of a workstation-to-peripheral connection is ongoing. If, while the workstation had the logged on system status, the user had started, but not completed, establishing a workstation-to-peripheral connection, the user may be prevented from establishing a workstation-to-peripheral connection once the workstation has the locked system status. It is likely, in such a scenario, that the application executed by the workstation to allow for the establishment of a workstation-to-peripheral connection awaits further user input, which user input is prevented by the locked system status.

According to one example embodiment, there is provided, at a user interface module, a method of facilitating user interface management. The method includes receiving a command message to cease execution, transmitting a state information message to a user interface manager, the state information message including a control-state data structure and ceasing execution. In other aspects of the present application, an apparatus is provided for carrying out this method and a computer readable medium is provided for adapting a processor to carry out this method.

According to another example embodiment, there is provided a method of managing multiple user interfaces on a computing apparatus. The method includes receiving, from a providing user interface module, a control-data structure describing a state of the providing user interface module, storing the control-data structure, receiving, from a requesting interface module, a request for user interface state and transmitting, to the requesting user interface module, the control-data structure. In other aspects of the present application, an apparatus is provided for carrying out this method and a computer readable medium is provided for adapting a processor to carry out this method.

According to another example embodiment, there is provided a method of managing user interfaces. The method includes receiving a state information message from a first user interface module, storing the state information, receiving a request for the state information from a newly operational interface module and responsive to the receiving the request, transmitting the state information to the newly operational interface module. In other aspects of the present application, a computing apparatus is provided for carrying out this method and a computer readable medium is provided for adapting a processor to carry out this method.

It is noted at www.wikipedia.org that, in computing, "Winlogon" is a component of Microsoft® Windows® operating systems that is responsible for handling a secure attention key, loading a user profile on logon and, optionally, locking the computer when a screensaver is running (requiring another authentication step). The obtaining and verification of user credentials is left to other components.

Winlogon handles interface functions that are independent of authentication policy. Winlogon creates desktops for the workstation, implements time-out operations, provides a set of support functions for a Graphical Identification and Authentication (GINA) library and takes responsibility for configuring Group Policy for machine and user.

The GINA library is a component of some Microsoft Windows operating systems that provides secure authentication and interactive logon services. The GINA library is a dynamically linked library (DLL) that is loaded in the context of the Winlogon process when the machine is started. The GINA library is responsible for handling a secure attention sequence, typically Control-Alt-Delete, and interacting with the user when this sequence is received. The GINA library, alternatively referred to as simply "GINA", is also responsible for starting initial processes for a user (such as the Windows Shell) when the user first logs on.

Winlogon is, by default, configured to use a default GINA. Winlogon can be configured to use a different GINA, thereby providing for non-standard authentication methods and/or providing for a visual user interface that is different than the visual user interface that is provided by the default GINA.

A file representative of the GINA DLL is typically located in the System32 folder and can be replaced with a file representative of a customized GINA DLL that provides alternative user identification and authentication procedures, such as those authentication procedures that depend on communication with a biometric peripheral device.

Exemplary non-standard authentication methods may involve a smart card reader and may involve identifying a user based on biometrics. Developers who implement a replacement GINA provide implementations for a set of application programming interface (API) calls, which cover functionality such as displaying a "workstation locked" dialog, processing the secure attention sequence in various user states, responding to queries as to whether or not locking the workstation is an allowed action, supporting the collection of user credentials on Terminal Services-based connections and interacting with a screen saver. The Winlogon component is solely responsible for calling these APIs in the GINA library.

A Windows "service" is an application that starts when the Windows operating system is booted and runs in the background as long as Windows is running. Windows provides an interface called a Service Control Manager (SCM) that manages creating, deleting, starting and stopping of services. An application that is to be registered as a service needs to be written in such a way that the application can handle messages (start, stop, pause, etc.) from the SCM. Then, in one or more API calls, the name of the service and other attributes, such as the description of the service, may be registered with the SCM.

Windows services are, by default, run as a virtual user that is associated with an account called "LocalSystem". Since LocalSystem is not a real user, some challenges present themselves when user-specific data needs to be stored by the service, as there is no home directory for the user associated with the LocalSystem account.

The SCM maintains a database of registered services and includes information on how each service should be started. The SCM also enables system administrators to customize security requirements for each service and, thereby, control user access to the service.

If a given service is running in the context of the LocalSystem account and has an attribute known as the SERVICE_INTERACTIVE_PROCESS attribute, the given service is known as an interactive service. An interactive service can display a graphical user interface (GUI) and receive user input.

It is known that running an interactive service under the context of the LocalSystem account may impose some risk and should generally be avoided. It has been suggested that, if a service that is running on a multi-user system must interact with a user, the service should do so through a separate GUI module, where the separate GUI module is run under the context of a user account. It has been further suggested that the separate GUI module should be designed to communicate with the service through some method of interprocess communication, such as a named pipe. This combination of a separate GUI module with a service is known as a client/server implementation and serves as an alternative to running an interactive service under the context of the LocalSystem account.

When it is necessary for a thread of a GUI module to transmit a message to a Windows service, where the message requires a response, the thread may create an entry on a "thread map", implemented, for example, as a map or a list. Each entry in the thread map may be considered to include: a response type; and a reference to a message transfer object. Examples of response types may include, among other things, a response to a version check request, a response to a synchronize settings request, and a response to a set IT policy request.

The message transfer object may contain: a flag indicating whether a response has been received; an event on which the thread should wait; and a response data field to hold data received in the response. Events on which the thread should wait can, for example, include an outstanding response to a previous request. An event can, for example, be a handle.

Before sending a message for which a response is expected, a sending thread first creates a message transfer object. The sending thread then places an entry in the thread map. Recall that the entry includes an indication of a unique response type (i.e., the response type for which the sending thread will wait) and a reference to the message transfer object. The sending thread then transmits the message. The sending thread then waits for an event, where the event is receipt of a response message having the unique response type.

A single thread known as a receiver thread is responsible for reading incoming messages, determining whether the incoming message is a response to a message sent by one of the sending threads and, if so, waking up the appropriate sending thread. The receiver thread idles until a message is received. Upon receiving an incoming message, the receiver thread reads the message type of the incoming message. The receiver thread compares the message type of the incoming message against the response type of each entry in the thread map. If the receiver thread finds an entry in the thread map with a response type that matches the message type of the incoming message, the receiver thread sets the response flag of the matching entry to "true", copies the incoming message into the response data field, removes the entry from the thread map and signals the "receipt of a response message" event.

The sending thread may continue upon recognizing that the "receipt of a response message" event has occurred. Upon continuing, the sending thread reviews the response flag in the message transfer object. If the response flag has a value of "true", then a response has been received and the response data field of the message transfer object may be expected to contain the response. If the response flag has a value of "false", then a response has not been received.

Separate user interface modules may exist as clients to a Windows service. For instance, a first user interface module may be used as a first client to a given Windows service when the workstation has a logged off system status or a locked system status and a second user interface module may be used as a second client to the given Windows service when the workstation has a logged on system status. The first user interface module has a first message engine for handling messages between threads in the first user interface module and the given Windows service. Similarly, the second user interface module has a second message engine for handling messages between threads in the second user interface module and the given Windows service.

Consider the case wherein the given Windows service communicates with a proximate device using the known Bluetooth® communication protocol. Such a Windows service may require user interaction to select a device to which to connect and may further require user entry of a passkey. Also consider a scenario in which a user is in the midst of establishing a Bluetooth connection through the use of the second user interface module, i.e., while logged on, when the workstation locks. Conventionally, the user would be unable to use the first user interface module, i.e., the user interface module designed for use when the workstation has a locked system status, to establish a Bluetooth connection while faced with the logon user interface because a thread in the second user interface module is still waiting for user input for transmitting to the Windows service responsible for establishing the Bluetooth connection.

In overview, to police the user interface modules and direct messages to the correct user interface module, a user interface manager module may be implemented. Responsive to a change in system status, the user interface manager module determines the state of the first user interface module and transmits an indication of the state of the first user interface module to the second user interface module. Additionally, the user interface manager module copies entries from a thread map associated with the first user interface module to a thread map associated with the second user interface module.

FIG. 1 illustrates a workstation 100 including, as is typical, a processor 102 and, in communication with the processor 102, a display 104, an input device 106 and a memory 108. The processor 102 may execute various software entities and modules for executing methods exemplary of this application. The software entities and modules are illustrated in FIG. 1 as GINA 110, a Windows service 112, a first user interface module 114, a second user interface module 116 and a user interface manager 118. The software entities and modules may be loaded on the memory 108 from a disk, a tape, a chip or a random access memory containing a file downloaded from a remote source.

Figure 2:
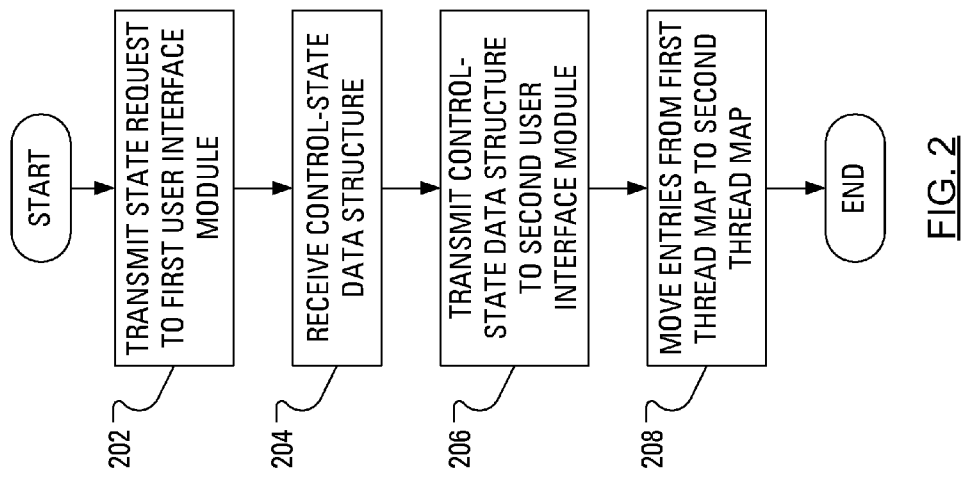
FIG. 2 illustrates exemplary steps of a method of managing user interfaces responsive to a change in system status from a current system status to a new system status according to one embodiment.
Figure 3:
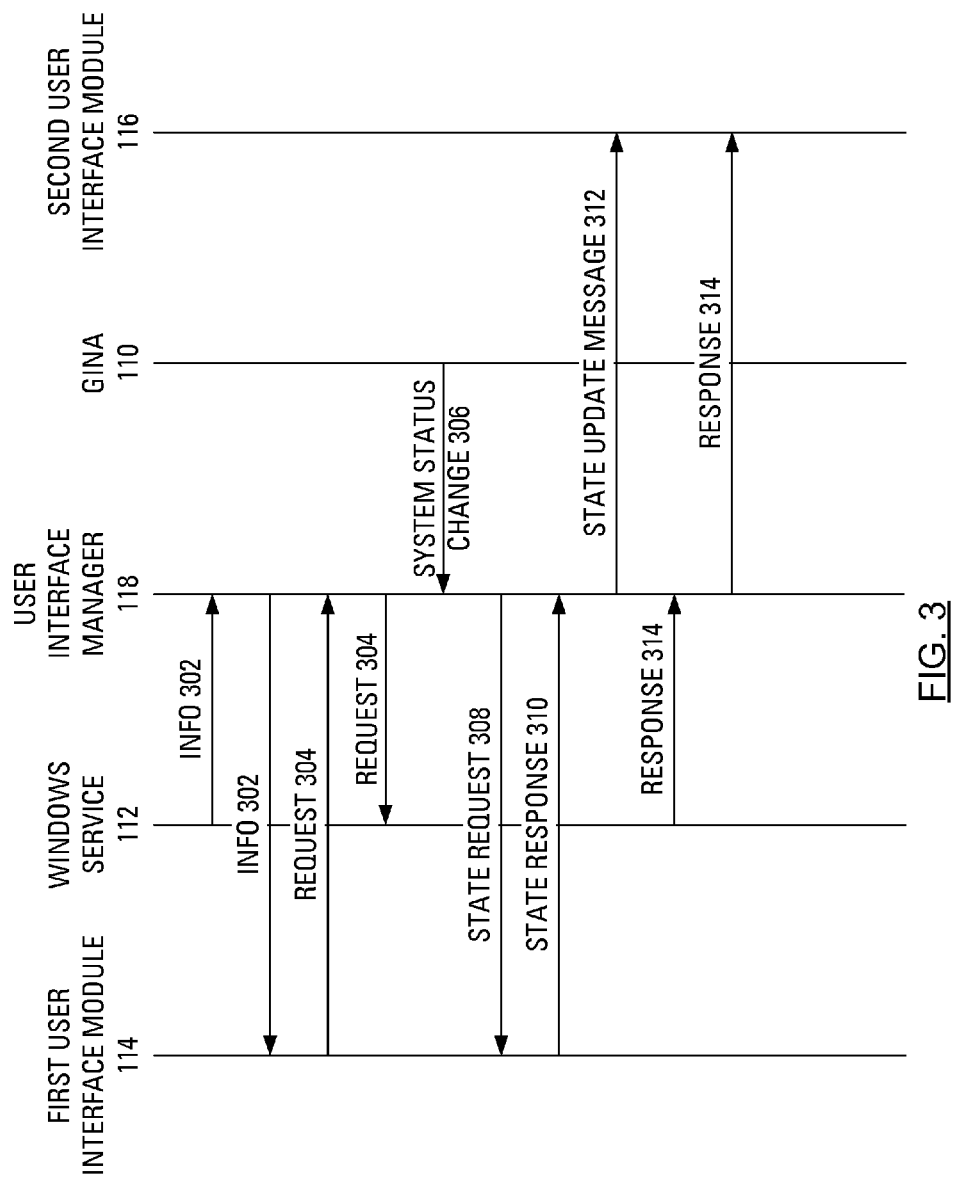
FIG. 3 illustrates a message flow related to execution of the exemplary steps of FIG. 2.

FIG. 2 illustrates exemplary steps of a method of managing user interfaces responsive to a change in system status from a current system status to a new system status. FIG. 3 illustrates a message flow related to execution of the exemplary steps of FIG. 2. With reference to FIG. 3, in an initial condition, the first user interface module 114 is communicating with the Windows service 112. In particular, FIG. 3 illustrates the Windows service 112 transmitting an information message 302 to the user interface manager 118. Notably, where the first user interface module 114 would normally be registered with the Windows service 112, the user interface manager 118 is registered instead. The user interface manager 118 receives the information message 302 and, based on the current system status (i.e., logged on), selects the first user interface module 114 as the destination.

The first user interface 114 receives the information message 302 from the user interface manager 118 and generates a request message 304. Rather than send the request message 304 directly to the Windows service 112, the first user interface module 114 transmits the request message 304 to the user interface manager 118.

Where the request message 304 requires a response from the Windows service 112, the first user interface module 114 creates a message transfer object and places an entry in a thread map associated with the first user interface module 114, where the entry includes a reference to the message transfer object. The user interface manager 118 then forwards the request message 304 to the Windows service 112.

A change in system status then occurs. Exemplary system status changes include: logged off to logged on; logged on to logged off; logged on to locked; and locked to logged on. The GINA library 110 typically handles the event (e.g., a secure attention sequence, such as Control-Alt-Delete) that leads to the change in system status. As such, the GINA library 110 handles the sending of a message 306, indicating the change in system status, to the user interface manager 118.

Responsive to receiving the message 306 indicating the change in system status, the user interface manager 118 transmits (step 202, FIG. 2) a state request message 308 to the first user interface module 114. The first user interface module 114 formulates a state response message 310 by generating a control-state data structure that includes the state of the first user interface module 114. The information included in the control-state data structure may include: an indication of which dialog is displayed; an indication of which field of the dialog is in focus; and an indication of the contents of all of the fields of the dialog. The first user interface module 114 then transmits the state response message 310 to the user interface manager 118.

Upon receiving (step 204) the state response message 310, the user interface manager 118 formulates a state update message 312 to include the control-state data structure received in the state response message 310. The user interface manager 118 then transmits (step 206) state update message 312 to the second user interface module 116. Additionally, the user interface manager 118 copies (step 208) entries from the thread map associated with the first user interface module 114 to a thread map associated with the second user interface module 116 (such that the thread map associated with the second user interface 312 will include a thread waiting for the response to the request message 304).

The Windows service 112 then transmits a response message 314 to the user interface manager 118, where the response message 314 is a response to the request message 304. The user interface manager 118 receives the response message 314 and, based on the system status having changed, selects the second user interface module 116 as the destination.

A receiver thread of the second user interface module 116 receives the response message 314 from the user interface manager 118 and matches the message type of the response message 314 with the entry associated with the request message 304 in the thread map associated with the second user interface module 116. The receiver thread then generates an event that wakes up the thread waiting for a response to the request message 304.

Returning to the case wherein the given Windows service is a Bluetooth connection service and the scenario in which a user is in the midst of establishing a Bluetooth connection through the use of the second user interface module. The user may have, for instance, used a device-selection dialog of the second user interface module to select a proximate Bluetooth-enabled device. Additionally, the user may have, for instance, entered the first two digits of a four-digit passkey in an alphanumeric entry field of a passkey-entry dialog of the second user interface module before the workstation locked. Responsive to the locking of the workstation, the user interface manager transmits a state request to the second user interface module and receives a state response. The state response includes a control-state data structure that indicates that a passkey-entry dialog was open, that two digits have been received and the value of the two digits.

In the locked system status, the user requests initiation of a user interface module. The user interface manager, based on the locked system status, selects and initiates the first user interface module. Additionally, the user interface manager sends a state update message to the first user interface module. The state update message includes the control-state data structure that indicates that a passkey-entry dialog was open, that two digits have been received in the alphanumeric entry field and the value of the two digits. Upon initiation, the first user interface module presents the user with the passkey-entry dialog showing, in the alphanumeric entry field, that two digits have been received. Conventionally, the indication that a digit of a passkey has been received is accomplished with displaying, in the alphanumeric entry field, an asterisk ("*"). However, other symbols may be used, such as a period (".") or a bullet ("•").

While the copying (step 208) of the thread map associated with the second user interface module to the thread map associated with the first user interface module provides enough information to allow a thread of the first user interface module to await completion of the entry of the passkey, it is the information contained in the control-state data structure received in the state update message 312 that allows the first user interface module to present the passkey-entry dialog in the state that the dialog was in at the time of locking.

Advantageously, the above-proposed solution allows the user to seamlessly use a dialog interface to interact with, and provide input for, a Windows service in multiple situations, including the following: when a user is logged on; when the work station is locked; and when no user is logged on.

As will be apparent to a person of ordinary skill in the art, the user interface module designed for use when the system status is logged-off/locked may be integrated into a customized GINA library.

As an alternative to determining and transferring an indication of state of user interface module, responsive to receiving a message indicating a change in system status from GINA, the user interface manager may simply arrange to cancel the currently active threads of whichever user interface module is in use. Thereafter, in the new system status, the user may initiate interaction with the Windows service. Responsively, the user interface manager selects the appropriate one of the user interface modules and the user enters data from the beginning.

Figure 4:
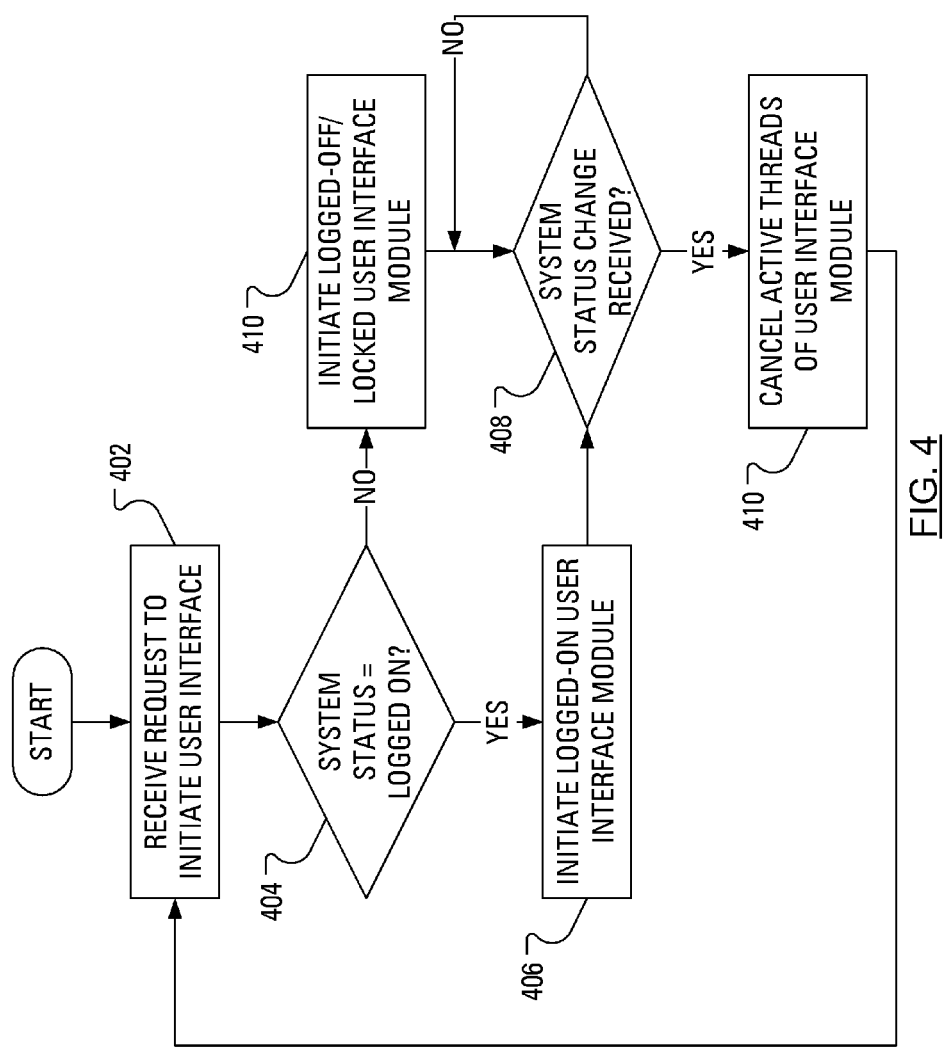
FIG. 4 illustrates exemplary steps of a method of managing multiple user interfaces to a service according to another embodiment.

FIG. 4 illustrates exemplary steps of a method of managing multiple user interfaces developed for use with a single Windows service. Initially, a user interface manager receives (step 402) a request to initiate a user interface to a Windows service. The user interface manager then determines (step 404) the status of the system. If the user interface manager determines that the system status is "logged on", the user interface manager selects the logged-on user interface module and initiates (step 406) the logged-on user interface module. While the logged-on user interface module is executing, the user interface manager may determine (step 408) that a system status change message has been received. If the user interface manager determines (step 408) that a system status change message has been received, the user interface manager arranges to cancel (step 410) the currently active threads of the logged-on user interface module. If the user interface manager determines (step 408) that a system status change message has not been received, the user interface manager continues to monitor for such receipt.

Canceling (step 410) the currently active threads of the logged-on user interface module may involve, for instance, removing each entry from the thread map associated with the currently active threads and generating events instructing each of the currently active threads to terminate. Such canceling may be considered equivalent to the reaction such a user interface module would have to a user selecting a "Cancel" button on a dialog presented by the user interface module. The result is that the user interface module returns to an idle state.

Advantageously, once the logged-on user interface module has returned to an idle state, the logged-on user interface no longer awaits further user input and a new user interface module may communicate with the Windows service without restriction.

In the new system status, the user interface manager may, again, receive (step 402) a request to initiate a user interface to the Windows service. The user interface manager then determines (step 404) the status of the system. If the user interface manager determines that the system status is "logged off" or "locked", the user interface manager selects the logged-off/locked user interface module and initiates (step 412) the logged-off/locked user interface module. While the logged-off/locked user interface module is executing, the user interface manager may determine (step 408) that a system status change message has been received. If the user interface manager determines (step 408) that a system status change message has been received, the user interface manager arranges to cancel (step 410) the currently active threads of the logged-off/locked user interface module. If the user interface manager determines (step 408) that a system status change message has not been received, the user interface manager continues to monitor for such receipt.

Although, as presented in the exemplary steps of the method of FIG. 4, there are only two user interface modules to choose between, a person of ordinary skill in the art would recognize that a plurality of user interface modules may be made available, one user interface module for each system status. As such, selecting (step 404) a candidate user interface module to initiate, based on the system status, may be more complex than simply determining whether the workstation has logged-on system status.

Figure 5:
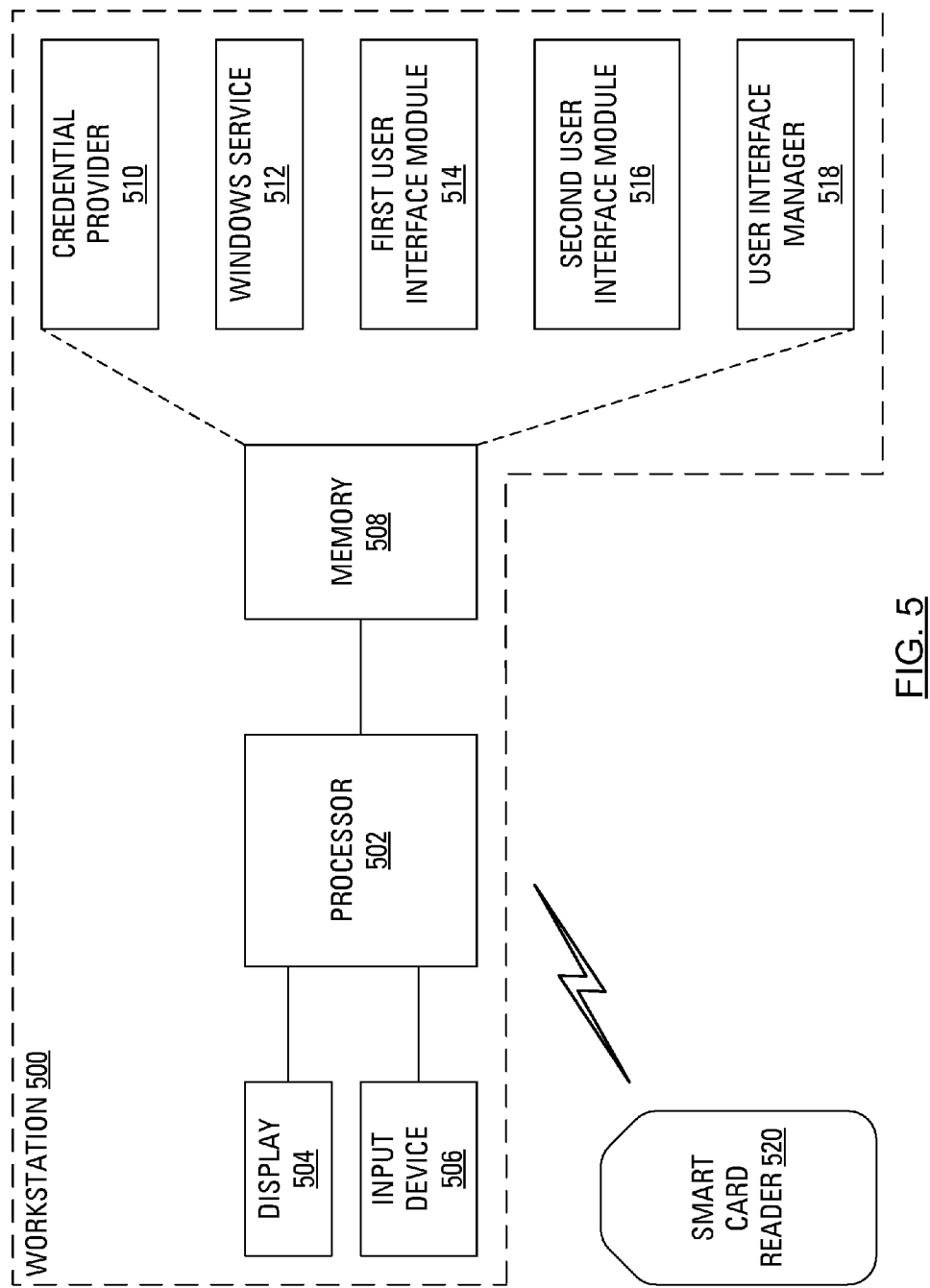
FIG. 5 illustrates another workstation adapted to embody aspects of the present application.

FIG. 5 illustrates a workstation 500 including, as in the workstation 100 of FIG. 1, a processor 502 and, in communication with the processor 502, a display 504, an input device 506 and a memory 508. The processor 502 may execute various software entities and modules for executing methods exemplary of this application. The software entities and modules are illustrated in FIG. 5 as a credential provider 510, a Windows service 512, a first user interface module 514, a second user interface module 516 and a user interface manager 518. The software entities and modules may be loaded on the memory 508 from a disk, a tape, a chip or a random access memory containing a file downloaded from a remote source. FIG. 5 also includes a smart card reader 520 in communication with the workstation 500.

When transferring state information between the first user interface module 114 (for a logged on state) and the second user interface module 116 (for a logged off or locked state) on Windows XP™, which may, for instance, be the operating system executed by the processor 102 in the workstation 100 of FIG. 1, there exists an ability to assume that both the first user interface module 114 and the second user interface module 116 (associated with GINA 110) are always running. With Windows VISTA™, which may, for instance, be the operating system executed by the processor 502 in the workstation 500 of FIG. 5, we have an added complication that the credential provider 510 (which, in Vista, replaces the GINA 110 that is used in XP) is not always running. Instead, the credential provider 510, and, consequently, the second user interface module 516 associated with the credential provider 510, is only executed when the locked/logged off screen is displayed, and, correspondingly, ceases execution when the user unlocks/logs on.

This makes transferring dialog state information trickier in Vista than in XP because, for example, we cannot simply transfer state information from the second user interface module 516 associated with the credential provider 510 to the first (logged-on) user interface module 514 when logging on, since the second user interface module 516 will cease execution before the first user interface module 514 commences execution. To further complicate matters, there exists a possibility that there will be threads (related to the Windows service 512) that are waiting on responses from the dialogs maintained by the second user interface module 516. As described hereinbefore, thread map entries can be moved (step 208, FIG. 2) from the thread map associated with the second user interface module 116 to the thread map associated with the first user interface module 114. In the Vista (FIG. 5) case, however, a destination is not immediately available to which to move the waiting thread map entries, since the second user interface module 516 and the first user interface module 514 are not executing simultaneously. When the credential provider 510 ceases execution, any threads that were waiting for responses from the second user interface module 516 are cancelled.

An example of the current problem begins in a scenario wherein no users are currently logged in to the workstation 500 of FIG. 5, the credential provider 510 is executing and the first (logged-on) user interface module 514 is not executing.

a) A user initiates a connection process to connect the workstation 500 to a smart card reader 520, which connection process uses a dialog controlled by the second user interface module 516;

b) Part way through the connection process, the user logs into the workstation 500 using a username and a corresponding password, leaving the connection process in progress;

c) The second user interface module 516 ceases execution;

d) The user interface manager 518 attempts to copy the state of the connection process dialog from the second user interface module 516 to the first user interface module 514; and e) Since the first user interface module 514 is not yet executing, there is no destination to which to transfer the state, so the connection process is cancelled.

It is likely that the user would prefer to continue the connection process from the point in the process at which the process was left. However, in this case, if the user wishes to complete the connection process, the user is obliged to restart the connection process.

A similar problem exists when the user logs off (in Vista and XP) in the midst of a connection process. There exists a requirement to transfer the state from the first user interface module 514 to the second user interface module 516 but the second user interface module 516 is not yet executing.

In overview, the second user interface module 516, responsive to receiving a command to terminate while processes are ongoing, transmits state information to the user interface manager 518 before self-terminating. The user interface manager 518 stores the state information in a memory, or "cache". That is, the user interface manager 518 caches the state information. In addition, the user interface manager 518 may transfer the thread map entries associated with the second user interface module 516 to the user interface manager 518 to be cached. Subsequently, when the first user interface module 514 commences operation and contacts the user interface manager 518, the user interface manager 518 responds with the cached state information and transfers thread map entries from the cache to the thread map associated with the first user interface module 514.

The user interface manager 518 holds the latest known state information in a cache, and both the first user interface module 514 and the second user interface module 516 may retrieve the state information whenever the state information is required. Also, both the first user interface module 514 and the second user interface module 516 are provided with a capability to update the cache at the user interface manager 518 at anytime.

Rather than directly moving entries in one thread map to another thread map, as was proposed in step 208, it is now proposed to maintain, in the user interface manager 518, a cache of thread map entries until the entries may be transferred to the thread map associated with another user interface module. Such a transfer may take place in association with a transfer of state information to the other user interface module.

Figure 6:
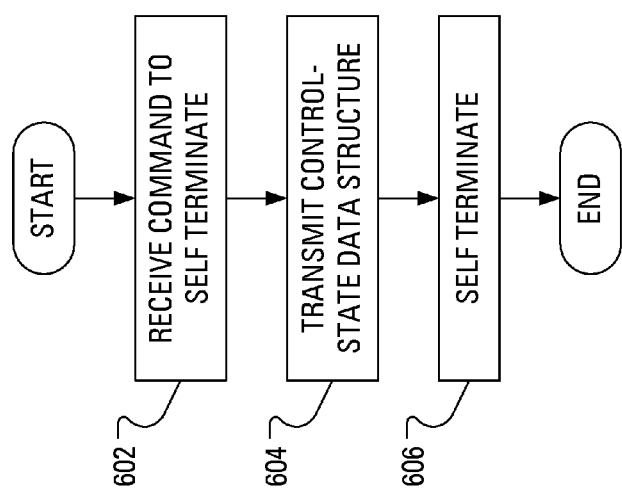
FIG. 6 illustrates exemplary steps of a method of facilitating management of user interfaces according to one embodiment.
Figure 8:
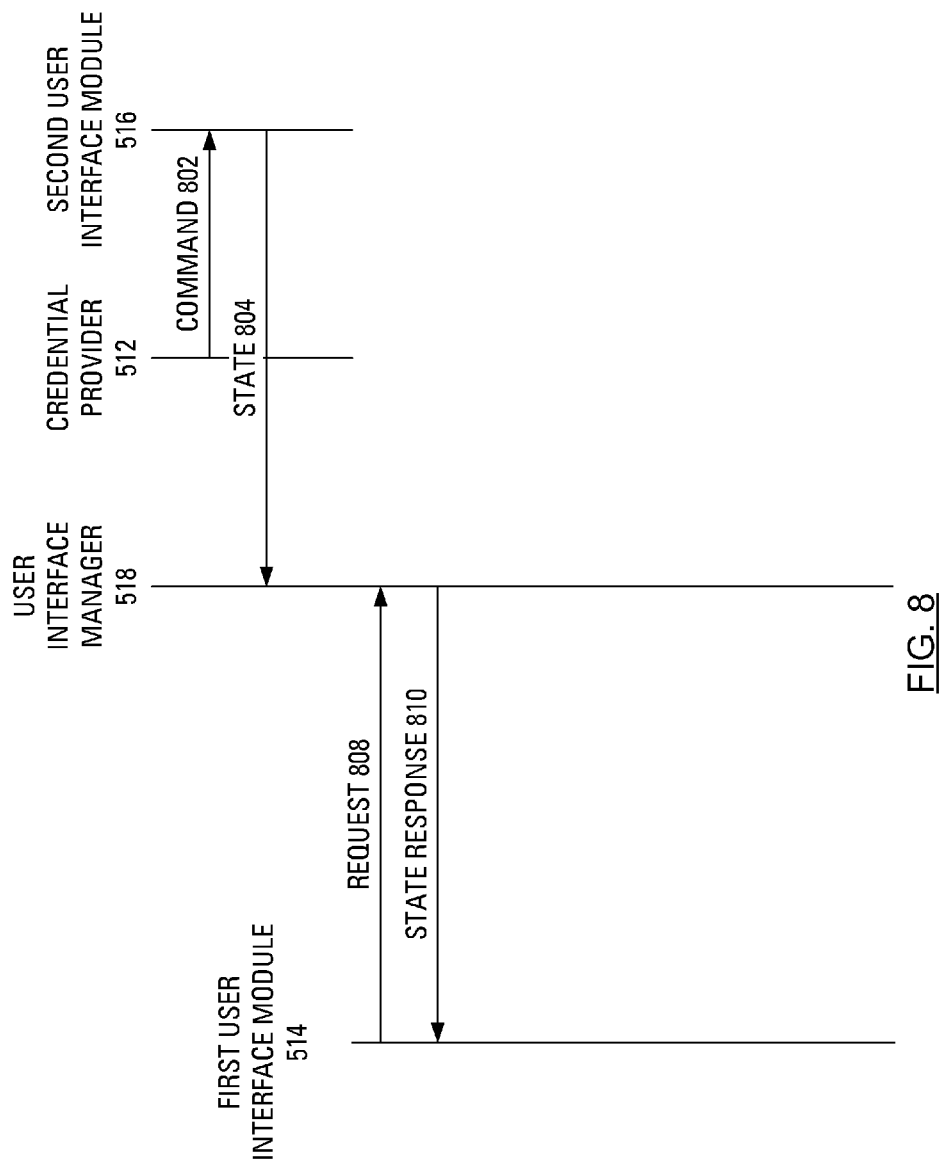
FIG. 8 illustrates a message flow related to execution of the exemplary steps of the methods of FIG. 6 and FIG. 7.

FIG. 6 illustrates steps in an example method of responding to a command to terminate execution while processes are ongoing. Initially, the second user interface module 516 receives (step 602) a command message 802 (see FIG. 8), say, from the credential provider that has just granted access to the computer, instructing the second user interface module 516 to cease execution. Responsive to receiving the command, the second user interface module 516 transmits (step 604) a state message 804 indicating the state of any currently in progress user interface sessions. Such a message 804 may take the form of a control-state data structure as discussed hereinbefore. In response to this message, the user interface manager 518 stores, or caches, each entry in the thread map associated with the second user interface module 516. Once this message 804 has been transmitted, the second user interface module 516 ceases execution (step 606).

Figure 7:
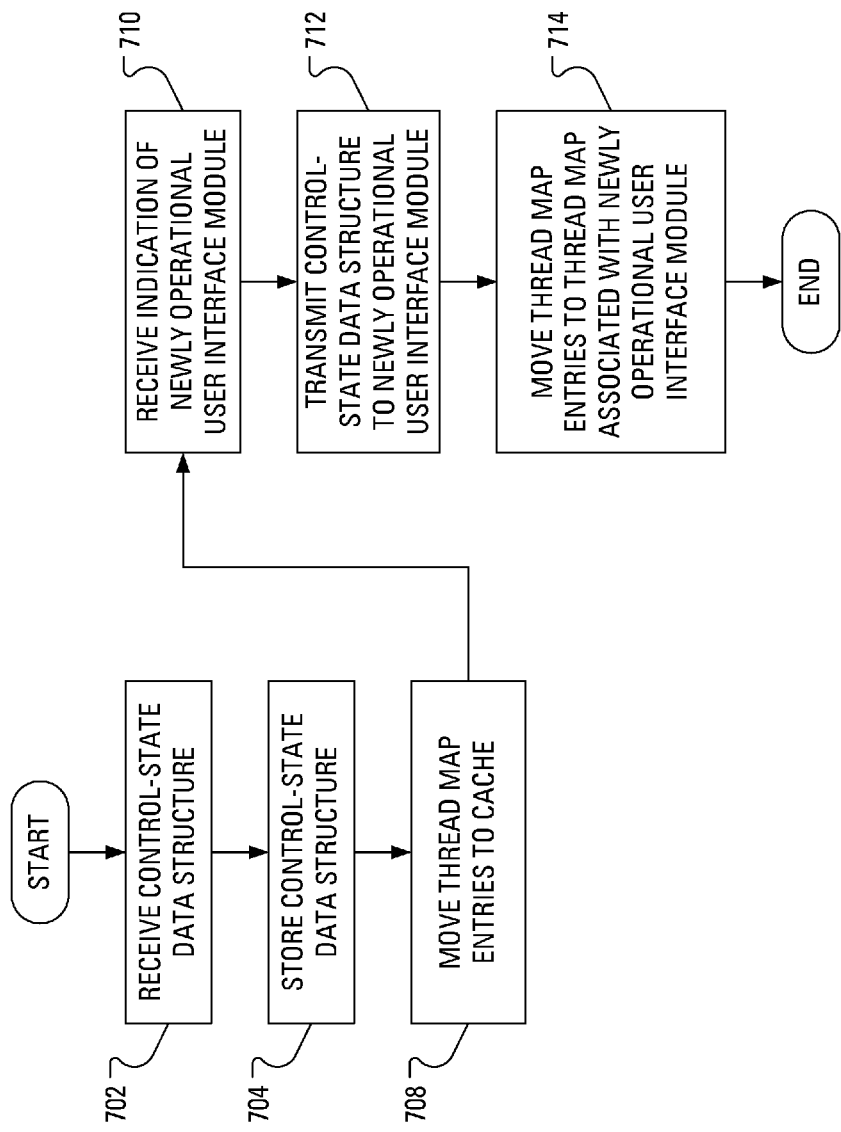
FIG. 7 illustrates exemplary steps of a method of managing non-contemporaneous user interface modules according to another embodiment.

The perspective of the user interface manager 518 is presented in an example method in FIG. 7.

The user interface manager 518 receives (step 702) the state information message 804 transmitted by the second user interface module 516 and stores (step 704) the state information. The user interface manager 518 also moves (step 708) the thread map entries associated with the second user interface module 516 to the cache. Subsequently, responsive to the login by the user that caused the termination of the credential provider 510 and the associated second user interface module 516, the first user interface module 514 commences operation and transmits a request message 808 to the user interface manager 518. The user interface manager 518 receives (step 710) the request message 808 and responds by transmitting (step 712) a state response message 810 including cached state information that had been, earlier, received from the second user interface module 516. Furthermore, the user interface manager 518 moves (step 714) the thread map entries from the cache to a thread map associated with the first user interface module 514, which thread map entries had been, earlier, cached from the second user interface module 516.

Consider operation of aspects of the present application in the following scenario:

a) After initiating, but not completing, a connection process between the smart card reader 520 and the workstation 500, a user initiates a login process, with a username and password combination, to log in to the workstation 500 of FIG. 5;

b) The second user interface module 516 associated with the credential provider 510 detects that it is being terminated and transmits (step 604) a state message 804, which includes the state of the connection process, to the user interface manager 518;

c) The user interface manager 518 caches (step 704) the state of the connection process and also caches (step 708) the thread map entries;

c) The login process completes and execution of the first user interface module 514 commences;

d) The first user interface module 514 transmits, to the user interface manager 518, a request message 808, requesting the current UI state;

e) The user interface manager 518 transfers the cached thread map entries to the thread map associated with the first user interface module 514 so that the threads are waiting for responses from the appropriate UI module; and f) The first user interface module 514 displays the appropriate dialog based on the cached state.

As will be apparent to a person of ordinary skill in the art, instead of only two user interface modules (the first user interface module 514 and the second user interface module 516), there can be many user interface modules. There are also two classes of UI information: stateless UI information; and thread-associated UI information. Stateless UI information generally comprises any UI information that does not have a thread waiting on its response; an information message box, for example. Thread-associated UI information generally comprises any UI information related to a thread that is waiting for a response, as well as the semaphore responsible for blocking the thread.

Any user interface module can retrieve stateless UI information from the cache at the user interface manager 518 and create a display based on the stateless UI information. Furthermore, any user interface module can update the stateless UI information. Only one user interface module (e.g., the active user interface module) can access the thread-associated UI information, as well as the threads that go with the thread-associated UI information, "checked out" from the cache, and only the active user interface module can check the thread-associated UI information back into the cache. Once checked in, another user interface module can "check out" the thread-associated UI information.

In some cases, neither a GINA library nor a credential provider may be installed on a workstation. GINA and credential provider are components whose installation is optional during the installation of Windows. Consequently, a user interface module associated with GINA or the credential provider may never execute.

Consider the case wherein a message (a user interface dialog) is displayed on a workstation with timing associated with a user of the workstation walking away from the workstation, such that the user does not see the message. The message could be important; for instance, the message could indicate that another device has paired with the user's smart card reader.

It is anticipated that the user may have previously established an option according to which the user is logged out of the workstation upon removal of a smart card. The user walks away from the workstation and the workstation logs off the user. Since neither GINA nor CP is installed, the smart card application UI is not transferred to the logoff screen. Accordingly, the user does not see the important message.

Where aspects of the present application are implemented at the workstation, the scenario may proceed as follows:

a) As the user walks away from the workstation 500, a wireless connection between the workstation 500 and a smart card reader associated with the user terminates due to an out-of-range condition, the processor 502 interprets the loss of connection to the smart card reader as a removal of a smart card in the reader and the processor initiates a logoff operation;

b) The first user interface module 514 detects the initiation of the logoff operation and transmits a state message and a thread message to the user interface manager 518, before ceasing execution;

c) The user interface manager 518 receives (step 702) the state message, caches (step 704) the UI state included in the state message, receives (step 706) the thread message and caches (step 708) included information on threads and locks;

d) The user returns to the workstation 500 and logs in;

e) Execution of the first user interface module 514 recommences and the first user interface module 514 transmits a request message to the user interface manager 518;

f) Upon receiving a response to the request message, the response including state information, the first user interface module 514 redisplays the user interface view that was on the display before the user was logged off the workstation 500.

Workstation security is improved because there is no availability for an attacker to dismiss a pairing notification message from the workstation lock screen. Before being able to interact with the notification message, the user must first authenticate to the workstation 500, using appropriate login information.

It is further contemplated that the user interface module manger 518 could store the state information and thread map entries in a hash table, so that cached state information or thread map information can be specific to distinct users of the workstation 500.

As will be clear to a person of ordinary skill in the art, although the above embodiments are centered around a workstation executing a Windows operating system, aspects of the disclosure may be applicable to the facilitation of user interface management for handheld computing devices and other mobile communication devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. At a user interface module executed on a workstation, the workstation including an input device and the user interface module associated with a peripheral device, a method of facilitating user interface management, said method comprising:

receiving, via the input device, partial input associated with establishment of a connection between the workstation and the peripheral device;

while receiving partial input associated with establishment of the connection between the workstation and the peripheral device, receiving a command message to cease execution of the user interface module associated with the peripheral device;

prior to ceasing execution of the user interface module associated with the peripheral device, transmitting a state information message to a user interface manager, the state information message including a control-state data structure, said control-state data structure including said partial input; and ceasing execution of the user interface module associated with the peripheral device.

2. A computing apparatus comprising:
an input device;
a processor that executes a user interface module to:
receive, via the input device, partial input associated with establishment of a connection between the computing apparatus and a peripheral device;
while receiving partial input associated with establishment of the connection between the computing apparatus and the peripheral device, receive a command message to cease execution of the user interface module associated with the peripheral device;
prior to ceasing execution of the user interface module associated with the peripheral device, transmit a state information message to a user interface manager, the state information message including a control-state data structure, said control-state data structure including said partial input; and
cease execution of the user interface module associated with the peripheral device.

3. A non-transitory computer readable medium containing computer-executable instructions that, when performed by a processor in a workstation, cause said processor to:
receive, via an input device, partial input associated with establishment of a connection between the workstation and a peripheral device at a user interface module;
while receiving partial input associated with establishment of the connection between the workstation and the peripheral device receive a command message to cease execution of the user interface module associated with the peripheral device;
prior to ceasing execution of the user interface module associated with the peripheral device transmit a state information message to a user interface manager, the state information message including a control-state data structure, said control-state data structure including said partial input; and
cease execution of the user interface module associated with the peripheral device.

4. A method of managing multiple user interfaces on a computing apparatus, the method comprising:
receiving, from a providing user interface module, a control-data structure describing a state of said providing user interface module, said control-state data structure including an indication of partial input received in association with establishment of a workstation-to-peripheral connection;
storing said control-data structure including said input wherein storing comprises moving thread map entries associated with said providing user interface module to a cache;
receiving, from a requesting interface module, a request for user interface state; and
transmitting, to said requesting user interface module, said control-data structure.

5. A method of managing user interfaces, said method comprising:
receiving a state information message from a first user interface module, said state information message including an indication of partial input received in association with establishment of a workstation-to-peripheral connection that has not yet been established;
storing said state information including said input wherein storing comprises moving one or more thread map entries associated with said first user interface module to a cache;
receiving a request for said state information from a newly operational interface module; and
responsive to said receiving said request, transmitting said state information to said newly operational interface module.

6. The method of claim 5 further comprising, responsive to said receiving said request, moving said thread map entries from said cache to a thread map associated with said newly operational user interface module.

7. A computing apparatus comprising a processor that executes a user interface manager to:
receive a state information message from a first user interface module, said state information message including an indication of partial input received in association with establishment of a workstation-to-peripheral connection that has not yet been established;
store said state information including said input wherein storing comprises moving one or more thread map entries associated with said first user interface module to a cache;
receive a request for said state information from a newly operational interface module; and
transmit said state information to said newly operational interface module responsive to said receiving said request.

8. The computing apparatus of claim 7 wherein said user interface manager is further arranged to, responsive to said receiving said request, move said thread map entries from said cache to a thread map associated with said newly operational user interface module.

9. A non-transitory computer readable medium containing computer-executable instructions that, when performed by a processor, cause said processor to:
receive a state information message from a first user interface module, said state information message including an indication of partial input received in association with establishment of a workstation-to-peripheral connection that has not yet been established;
store said state information including said input wherein storing comprises moving one or more thread map entries associated with said first user interface module to a cache;
receive a request for said state information from a newly operational interface module; and
transmit said state information to said newly operational interface module responsive to said receiving said request.

10. The non-transitory computer readable medium of claim 9 wherein said computer-executable instructions further cause said processor to, responsive to said receiving said request, move said thread map entries from said cache to a thread map associated with said newly operational user interface module.

11. A security system comprising:

a smart card reader;

a computing apparatus having a processor that executes a user interface module for facilitating a formation of a connection between said smart card reader and said computing apparatus, said user interface module to:

receive partial input associated with establishment of said connection;

while receiving partial input associated with establishment of said connection between said smart card reader and said computing apparatus, receive a command message to cease execution of the user interface module associated with the connection;

prior to ceasing execution of the user interface module associated with the connection, transmit a state information message to a user interface manager, the state information message including a control-state data structure, said control-state data structure including said input; and cease execution of the user interface module associated with the connection between said smart card reader and said computing apparatus.

12. A security system comprising:

a smart card reader;

a computing apparatus having a processor that executes a user interface manager for facilitating a formation of a connection between said smart card reader and said computing apparatus, said user interface manager to:

receive, from a providing user interface module, a control-data structure describing a state of said providing user interface module, said control-data structure including an indication of partial input received in association with establishment of said connection that has not yet been established;

store said control-data structure including said input wherein storing comprises moving thread map entries associated with said providing user interface module to a cache;

receive, from a requesting interface module, a request for user interface state; and transmit, to said requesting user interface module, said control-data structure.

13. A security system comprising:

a smart card reader;

a computing apparatus having a processor that executes a user interface manager for facilitating a formation of a connection between said smart card reader and said computing apparatus, said user interface manager to:

receive a state information message from a first user interface module, said state information message including an indication of partial input received in association with establishment of said connection that has not yet been established;

store said state information including said input wherein storing comprises moving thread map entries associated with said first user interface module to a cache;

receive a request for said state information from a newly operational interface module; and transmit said state information to said newly operational interface module responsive to said receiving said request.

* * * * *